Patented Feb. 21, 1928.

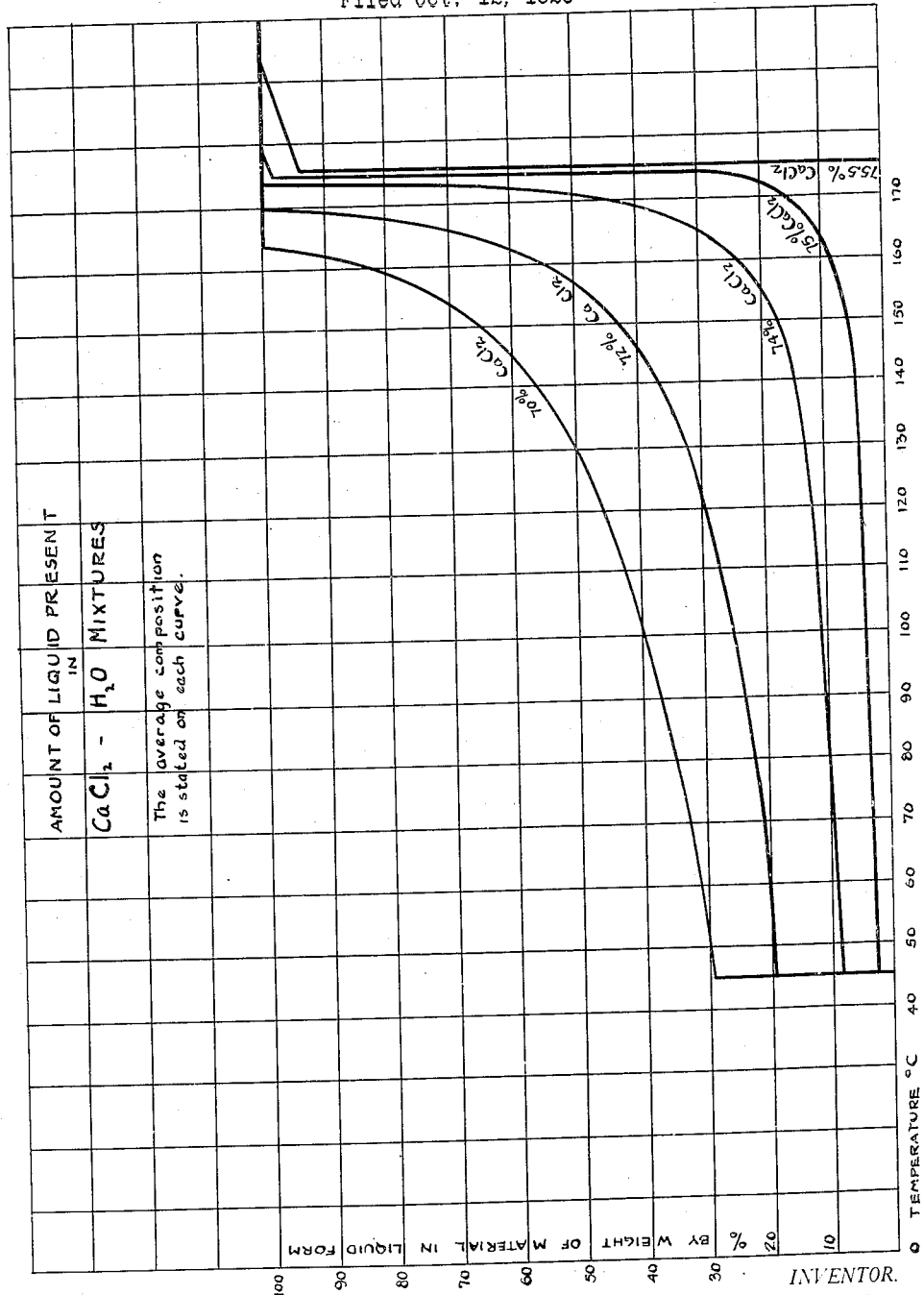

1,660,053

UNITED STATES PATENT OFFICE.

ALBERT KELVIN SMITH, OF MIDLAND, MICHIGAN, ASSIGNOR TO THE DOW CHEMICAL COMPANY, OF MIDLAND, MICHIGAN, A CORPORATION OF MICHIGAN.

PREPARED CALCIUM CHLORIDE AND METHOD OF MAKING SAME.

Application filed October 12, 1925. Serial No. 61,933.

While calcium chloride as well as other hygroscopic chlorides of metals of Group II, and particularly of magnesium, have been marketed for some time past in flaked condition, produced by rotating a drum maintained at a suitable temperature in contact with the body of such chloride in fluid or molten condition, and then scraping off the layer of the material which adheres to the surface of the drum, the particles composing such flaked product tend to coalesce or adhere together in a package or when piled in storage so as to form practically a solid body thereof again.

The same difficulty is encountered where the chloride is prepared in the form of a solid cake and then granulated in any of the usual ways.

One method for overcoming this objectionable characteristic of such product, as well as the new and improved product resulting from the application of such method, will be found set forth in U. S. Letters Patent No. 1,527,121, dated February 17, 1925, such patent and method, briefly stated, consisting in comminuting the fused material and then superficially dehydrating the resulting particles.

Calcium chloride as heretofore attainable has carried a considerable proportion of water of crystallization. Correspondingly, as affects large-scale shipping, the bulk and freight-charges on an undesirably large amount of water is involved. In accordance with my present invention, however, dry calcium chloride with a water content of even less than 16 per cent may be prepared, available in cakes, drums, or the like, or in granular form or flakes, and such moreover that where in granular form or flakes the tendency of the particles to stick together is reduced, and a free-flowing product is had.

The invention, accordingly, consists of the steps and product hereinafter fully described and particularly pointed out in the claims. The single figure that appears in the annexed drawing represents the amount of liquid present in calcium chloride-water mixtures and serves as a diagrammatic illustration of certain of the conditions to be observed in carrying out the present improved method or process.

Since all commercial calcium chloride contains some water, it is also desirable to set forth the properties of the compounds of such chloride and water as a basis for the explanation hereinafter given of the formation and characteristics of the present improved prepared forms of such chloride. In the following table will accordingly be found the more important data relating to the compounds which exist within the temperature range of 0° to 200° C., viz:—

Transition point data.

| Formula | Per cent CaCl$_2$ | Temp. deg. C. | Solution formed | | Temp. of complete solution |
|---|---|---|---|---|---|
| | | | %CaCl$_2$ | Amount | |
| CaCl$_2$.6H$_2$O | 50.7 | 30 | 50.0 | 93.4% | 32.5° C. |
| CaCl$_2$.4H$_2$O* | 60.6 | 45 | 56.5 | 78.4 | 92 |
| CaCl$_2$.2H$_2$O | 75.5 | 175 | 74.8 | 93.8 | 194 |
| CaCl$_2$.H$_2$O | 86.0 | | | | |

(* The data given are for the "alpha" form of the tetrahydrate.)

The highest temperature at which each hydrate may exist is shown in the fourth column of the foregoing table and is known as the transition temperature. Transition points are distinguished from true melting points chiefly by the fact that the liquid phase formed has a composition different from that of the hydrate being heated. This is brought about by the simultaneous formation of a lower hydrate, that is, one having less water and a higher percentage of salt than the hydrate in question. Consequently, the solution formed when a solid hydrate is heated to its transition point always has a lower percentage of salt than the original hydrate. The amount of the lower hydrate formed depends upon the difference between the composition of the solution and that of the higher hydrate, being larger the greater the difference. For example, when the hexahydrate containing 50.7 per cent CaCl$_2$ is heated to 30° C., it decomposes into a solution containing 50.0 per cent CaCl$_2$, and the tetrahydrate containing 60.6 per cent CaCl$_2$. The resulting mixture is therefore 93.4 per cent solution and 6.6 per cent solid, by weight. The amount of solution formed by the decomposition of each hydrate at its transition point is given in the sixth column of the table.

Since the solubility of CaCl$_2$ always increases with temperature, the mixture of solution and lower hydrate, formed by the higher hydrate at the transition point, may be heated to such a temperature that all solid will disappear and complete solution result. This temperature is determined by that point on the solubility curve which corresponds to the composition of the higher hydrate; it is given in the last column of the table.

The behavior of a solution having the same composition as a pure hydrate when cooled is exactly the reverse of that of the heated hydrate. For example, a solution containing 60.6 per cent $CaCl_2$ (corresponding to the composition of the tetrahydrate) will become saturated when the temperature falls to 92° C. and precipitation will continue until 45° is reached and the amount of dihydrate has increased to 21.6 per cent of the mixture. At this point the dihydrate and remaining solution will react to form solid tetrahydrate, and the reaction will continue at that temperature until complete, and the mixture has entirely solidified. The behavior of the mixture at the transition point is therefore somewhat analogous to the freezing of a pure compound.

For a solution having a slightly higher percentage of $CaCl_2$ than the tetrahydrate, the result is very little different, and depends upon the presence of a corresponding excess of the dihydrate. Thus, a solution containing 65 per cent $CaCl_2$ will begin to precipitate the dihydrate at 130° C. and at 92° will consist of 29.5 per cent dihydrate by weight, and 70.5 per cent solution containing 60.6 per cent $CaCl_2$. The mixture will act, therefore, practically as before, the excess dihydrate taking the place of an inert solid impurity, and when cooled below 45° C. will completely solidify into a solid mixture of tetrahydrate and dihydrate in the proportions of 70.5 to 29.5.

If the boiling points of $CaCl_2$ solutions, as given in the literature, are expressed in the form of a curve (boiling points at 760 mm. pressure plotted against per cent $CaCl_2$), the resulting curve is found to intersect the solubility curve (temperature plotted against per cent $CaCl_2$) at about 161° C. This fact indicates that a solution of $CaCl_2$ continually evaporated at its true boiling point will begin to precipitate the dihydrate at 161° C. and continue to do so at that temperature until the solution has entirely disappeared and only solid dihydrate remains. Practically, however, $CaCl_2$ solutions not only superheat easily when boiled but also supersaturate to some degree, so that a higher boiling point may be reached than is indicated by the equilibrium data. Therefore, although the latter indicate that the temperature of a boiling $CaCl_2$ solution may not be raised above 161° C. at atmospheric pressure and that the most concentrated solution which may be obtained is the saturated solution corresponding to that temperature (69.3 per cent $CaCl_2$), actually a temperature as much as 10 degrees higher may easily be attained and a corresponding saturated solution of 72.5 per cent $CaCl_2$. If the evaporation is carried on until a small amount of dihydrate has precipitated, the final product may be made to contain an average of 73 to 74 per cent $CaCl_2$.

The present customary product of about 73 per cent $CaCl_2$ could easily be comminuted at the high temperature, but it then became a problem to cool the particles and at the same time prevent their agglomeration. A product of this composition at 92° C. may be considered as a solution of a composition corresponding to the tetrahydrate (60.6 per cent $CaCl_2$) plus excess dihydrate. The amount of excess in this case (73 per cent. $CaCl_2$ at 92° C.) would be 90 per cent with 10 per cent solution; at 45° the amount of solution is decreased to 8 per cent, but below 45° C. the remaining solution reacts with a corresponding amount of dihydrate to form the tetrahydrate and become entirely solidified. Consequently, any particles which may happen to be in contact at 45° would become cemented by the formation of the tetrahydrate. For this reason, if the particles be kept from intimate contact while they are still wet with solution (as by tumbling, etc.) and at the same time be kept from absorbing further moisture from the atmosphere until cooled below 45° C. (when formation of the tetrahydrate is completed), a permanently comminuted product could be obtained. Such end product however would still represent only 73 per cent calcium chloride.

In any case, a final product of less than 75.5 per cent $CaCl_2$ will contain some tetrahydrate which will decompose above 45° C. and form a corresponding amount of solution. If the temperature is maintained above 45° C., the solution will tend to penetrate to the surface of the particles and cement them together upon recooling. It will be seen advantageous to obtain a product having a percentage of $CaCl_2$ higher than 75.5 per cent. The advantage is shown graphically by the curve-sheet that constitutes the figure of the drawing, each curve giving the amount of solution present when the average composition is as stated.

It is theoretically impossible for three different hydrates to remain in equilibrium, since the highest and the lowest hydrate must react to form the intermediate hydrate until one of the former is completely removed. It is also impossible for more than one hydrate to persist in the presence of solution, except at the transition points. A consideration of these two facts further demonstrates the advantage of obtaining a final product with a $CaCl_2$ percentage higher than 75.5. Such a product must become a solid mixture of the dihydrate and monohydrate at any temperature below 175° C.

and unless it is heated to above that temperature, no solution can form to cement the particles when recooled except by the absorption of water from the atmosphere.

It has been shown above that it is impossible to obtain a solution of $CaCl_2$ at atmospheric pressure containing much more than about 73 per cent $CaCl_2$ and that such a solution must be both superheated and supersaturated. On the other hand, in accordance with my invention, the boiling point of the solution is raised by increasing the pressure, so that the saturated solution corresponding to the higher temperature may be obtained. For example, a saturated solution of calcium chloride at 186° C. and about 5 lbs. pressure per sq. in. above atmospheric, contains 75.2 per cent $CaCl_2$. That is, allowing for a small amount of superheating and supersaturation, a solution of 76 per cent $CaCl_2$ may easily be obtained under a pressure of 5 lbs. per sq. in. Then such a solution will spontaneously lose further water on the pressure being released and on being cooled below 175° C. permit solidification. The material may be cast in cakes or in drums, or I may provide the materials in comminuted form by breaking or grinding a solid mass of the chloride and water of crystallization after it is solidified by cooling, or I may obtain particles of the same composition and non-caking characteristic by comminuting in other ways, e. g., by atomizing the molten material and allowing the droplets to solidify, or by flaking the molten material on a so-called flaking drum, if desired. The term "particle" will accordingly be understood as referring to such divided forms of material irrespective of the particular means by which comminution is effected.

It will also be understood that the principle of the invention is applicable generally to other salts or mixtures of salts, the solubility of which in water increases rapidly near the boiling point, so that the concentration which it is possible to obtain at atmospheric pressure is limited by the concentration of the saturated boiling solution. Magnesium chloride, to which reference has hereinbefore been made, is another example. In the case of any such salt where the solubility increases rapidly with rise in temperature above the boiling point, this limited concentration may be exceeded by increasing the pressure with a consequent increase in boiling point temperature. In such case, accordingly, increased pressure increases the concentration of the solution which it is possible to obtain, and upon allowing such solution to solidify under properly controlled conditions, a product is obtained having a correspondingly reduced amount of water of crystallization.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. In the manufacture of a metallic salt containing water of crystallization, the steps which include preparing a concentrated aqueous solution of such salt under pressure, reducing the pressure, and reducing the temperature to a point capable of permitting solidification.

2. In the manufacture of a metallic salt containing water of crystallization, the steps which include preparing a concentrated aqueous solution of such salt under pressure, reducing the pressure, allowing the solution to solidify, and comminuting the solidified mass.

3. In the manufacture of calcium chloride, the steps which include preparing a concentrated aqueous solution of such salt under pressure, reducing the pressure, and reducing the temperature.

4. In the manufacture of calcium chloride, the steps which include preparing a concentrated aqueous solution of the calcium chloride under pressure, reducing the pressure, and reducing the temperature to a point capable of permitting solidification.

5. In the manufacture of calcium chloride, the steps which include preparing a concentrated aqueous solution of such salt under pressure, reducing the pressure, allowing the solution to solidify, and comminuting the solidified mass.

6. In the manufacture of calcium chloride, the steps which include preparing a solution of such chloride corresponding to saturation at about 190° C., reducing the temperature to a point capable of permitting solidification, and comminuting.

7. In the manufacture of calcium chloride, the steps which include preparing a solution of such chloride corresponding to saturation at about 190° C., allowing the solution to solidify, and comminuting the solidified mass.

8. In the manufacture of calcium chloride, the steps which include preparing a solution of such chloride corresponding to saturation at about 190° C., cooling the solution to a temperature below 175° C., and comminuting.

9. In the manufacture of calcium chloride, the steps which include preparing a solution of such chloride corresponding to saturation at about 190° C., cooling to a temperature below 175° C. under pressure, allowing the solution to solidify, and comminuting the solidified mass.

10. As a new article of manufacture, a metallic salt containing water of crystallization, such salt being in the form of a solid of substantially uniform composition having an analysis corresponding with that of a boiling saturated solution of such salt as subjected to a pressure above atmospheric and a corresponding temperature.

11. As a new article of manufacture, a metallic chloride containing water of crystallization and having a hygroscopic character, such chloride being in the form of a solid having an analysis corresponding with that of a boiling saturated solution of such chloride as subjected to a pressure above atmospheric and a corresponding temperature.

12. As a new articles of manufacture, a metallic chloride containing water of crystallization and having a hygroscopic character, such chloride being in the form of comminuted solid particles having a substantially uniform composition corresponding with the analysis of a boiling saturated solution of such chloride as subjected to a pressure above atmospheric and a corresponding temperature.

13. As a new article of manufacture, calcium chloride containing water of crystallization, such chloride being in the form of a solid having an analysis corresponding with that of a boiling saturated solution of such chloride as subjected to a pressure above atmospheric and a corresponding temperature.

14. As a new article of manufacture, calcium chloride containing water of crystallization, such chloride being in the form of comminuted solid particles having a substantially uniform composition corresponding with the analysis of a boiling saturated solution of such chloride as subjected to a pressure above atmospheric and a corresponding temperature.

15. As a new article of manufacture, calcium chloride in the form of particles of substantially uniform composition analyzing not less than seventy-five and one-half (75.5) per cent of the anhydrous salt.

16. As a new article of manufacture, calcium chloride containing water of crystallization, such chloride being in the form of particles of substantially uniform composition analyzing between seventy-six (76) and eighty-six (86) per cent of the anhydrous salt.

Signed by me this 9th day of October, 1925.

ALBERT KELVIN SMITH.